United States Patent
Lin et al.

(12) 
(10) Patent No.: US 10,578,877 B1
(45) Date of Patent: Mar. 3, 2020

(54) NEAR-EYE DISPLAY SYSTEM AND DISPLAY METHOD THEREOF

(71) Applicants: Chia-Ming Lin, Taipei (TW); Ting-Chi Chang, Taipei (TW); Yu-Chen Liu, Taipei (TW); Han-Szu Chou, Taipei (TW)

(72) Inventors: Chia-Ming Lin, Taipei (TW); Ting-Chi Chang, Taipei (TW); Yu-Chen Liu, Taipei (TW); Han-Szu Chou, Taipei (TW)

(73) Assignee: COMPAL ELECTRONICS, INC., Taipei (TW)

( * ) Notice: Subject to any disclaimer, the term of this patent is extended or adjusted under 35 U.S.C. 154(b) by 0 days.

(21) Appl. No.: 16/362,711

(22) Filed: Mar. 25, 2019

Related U.S. Application Data

(60) Provisional application No. 62/736,465, filed on Sep. 26, 2018.

(51) Int. Cl.
*G02B 27/01* (2006.01)
*G09G 3/34* (2006.01)
*H04N 5/232* (2006.01)
*H04N 5/235* (2006.01)

(52) U.S. Cl.
CPC ....... *G02B 27/0172* (2013.01); *G09G 3/3406* (2013.01); *H04N 5/2351* (2013.01); *H04N 5/23229* (2013.01); *G09G 2320/0626* (2013.01); *G09G 2360/144* (2013.01)

(58) Field of Classification Search
CPC ......... G09G 2320/0247; G09G 3/3614; G09G 5/02; G09G 5/06; G09G 2320/08; G06F 1/163
See application file for complete search history.

(56) References Cited

U.S. PATENT DOCUMENTS

| 7,970,172 B1 | 6/2011 | Hendrickson |
| 8,941,559 B2 | 1/2015 | Bar-Zeev et al. |
| 2017/0025091 A1* | 1/2017 | Haddick ............... G09G 5/02 |
| 2017/0265272 A1* | 9/2017 | Shan ............... H05B 37/0218 |
| 2018/0088323 A1 | 3/2018 | Bao et al. |

FOREIGN PATENT DOCUMENTS

CN             103389580        11/2013

OTHER PUBLICATIONS

"Office Action of Taiwan Counterpart Application", dated Apr. 30, 2019, p. 1-p. 5.

* cited by examiner

*Primary Examiner* — Gerald Johnson
(74) *Attorney, Agent, or Firm* — JCIPRNET

(57) ABSTRACT

A near-eye display system is provided. The near-eye display system includes a display, an image capturing device, a storage device and a processor. The image capturing device is configured to obtain an image of a field of view in which a user watches the display. The storage device is configured to record programs or commands. The processor loads and executes the programs or commands recorded in the storage device to: calculate an in-view brightness distribution according to the image; establish a luminosity invert mask according to the in-view brightness distribution; and control the display to display according to the luminosity invert mask. In addition, a display method for the near-eye display system is also provided.

14 Claims, 5 Drawing Sheets

MK

| 0 | 0.5 | 1 | 1 |
| 0 | 0.5 | 1 | 1 |
| 0 | 0.5 | 0.5 | 0.5 |
| 0 | 0 | 0 | 0 |

FIG. 4

DIST

| 255 | 128 | 0 | 0 |
| 255 | 128 | 0 | 0 |
| 255 | 128 | 128 | 128 |
| 255 | 255 | 255 | 255 |

FIG. 3

NEAR-EYE DISPLAY SYSTEM AND DISPLAY METHOD THEREOF

CROSS-REFERENCE TO RELATED APPLICATION

This application claims the priority benefit of U.S. provisional application Ser. No. 62/736,465, filed on Sep. 26, 2018. The entirety of the above-mentioned patent application is hereby incorporated by reference herein and made a part of this specification.

BACKGROUND

Technical Field

The invention relates to a display technique, and particularly relates to a near-eye display system and a display method thereof.

Description of Related Art

When Augment Reality (AR) glasses are used in outdoor situations, a backlighting condition (for example, facing direct sunlight during the day, facing car lights, street lights, signboard advertising lights and lights projected to the rearview mirror by rear vehicles, etc., at night) is often encountered, and it is unable to clearly look at the target in the front and a virtual target projected by the glasses.

In order to resolve the above problem, the existing practice is to add sunglasses outside the AR glasses to achieve the effect of shading the sunlight. However, according to such method, when an environment with extremely uneven brightness is encountered, details of dark portions cannot be clearly viewed.

SUMMARY

The invention is directed to a near-eye display system and a display method thereof, by which while a user is capable of clearly viewing an AR image, interference of external strong light is reduced.

An embodiment of the invention provides a near-eye display system including a display, an image capturing device, a storage device and a processor. The image capturing device is configured to obtain an image of a field of view range in which a user watches the display. The storage device is configured to record programs or commands. The processor is coupled to the display, the image capturing device and the storage device, and loads and executes the programs or commands recorded in the storage device to: calculate an in-view brightness distribution according to the image; establish a luminosity invert mask according to the in-view brightness distribution; and control the display to display according to the luminosity invert mask.

An embodiment of the invention provides a display method adapted to a near-eye display system, which includes following steps: obtaining an image of a field of view range in which a user watches a display of the near-eye display system; calculating an in-view brightness distribution according to the image; establishing a luminosity invert mask according to the in-view brightness distribution; and controlling the display to display according to the luminosity invert mask.

To make the aforementioned more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 3 is a schematic diagram of an in-view brightness distribution according to an embodiment of the invention.

FIG. 4 is a schematic diagram of a luminosity invert mask according to an embodiment of the invention.

DESCRIPTION OF THE EMBODIMENTS

Figure 1:
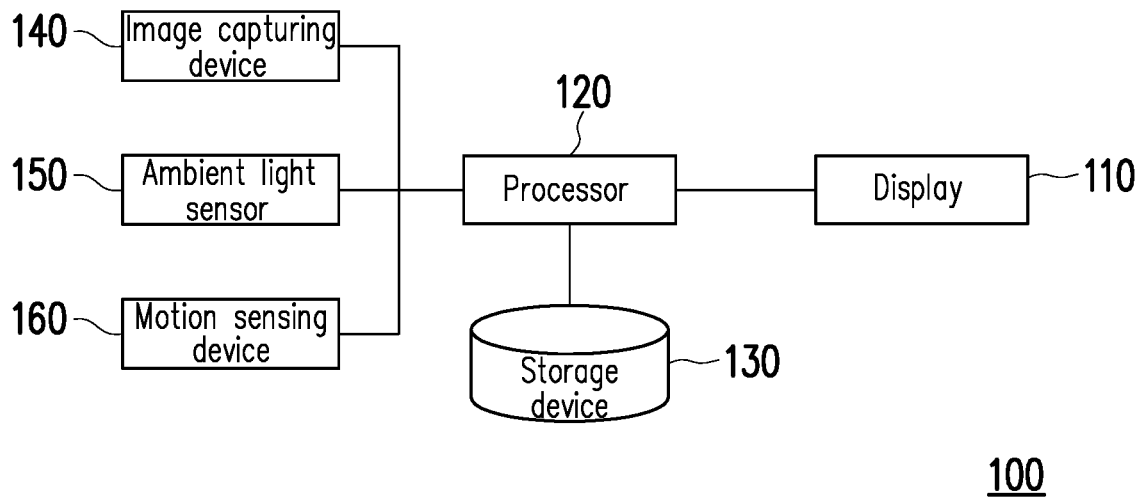
FIG. 1 is a block schematic diagram of a near-eye display system according to an embodiment of the invention.

FIG. 1 is a block schematic diagram of a near-eye display system according to an embodiment of the invention.

Referring to FIG. 1, the near-eye display system 100 includes a display 110, a processor 120, a storage device 130, an image capturing device 140, an Ambient Light Sensor (ALS) 150 and a motion sensing device 160, where the display 110, the storage device 130, the image capturing device 140, the ALS 150 and the motion sensing device 160 are all coupled to the processor 120. In the embodiment, the near-eye display system 100 is, for example, Augment Reality (AR) glasses, though the invention is not limited thereto.

The display 110 is a transparent display, which is, for example, a transmissive transparent display such as a Thin Film Transistor Liquid Crystal Display (TFT-LCD), a field sequential color display, and Active Matrix Organic Light Emitting Display (AMOLED), an Electrowetting display, etc., or a projective transparent display, which is not limited by the invention. In the embodiment, the display 110 is implemented as lenses of the AR glasses.

The processor 120 is, for example, a Central Processing Unit (CPU), or other programmable general purpose or special purpose microprocessor, a Digital Signal Processor (DSP), a programmable controller, an Application Specific Integrated Circuits (ASIC), a Programmable Logic Device (PLD) or other similar device or a combination of the above devices.

The storage device 130 may be any type of a fixed or movable Random Access Memory (RAM), a Read-Only Memory (ROM), a flash memory or a similar device or a combination of the above devices. In the embodiment, the storage device 130 records programs or commands adapted to be accessed and executed by the processor 120. The processor 120 may load programs or commands from the storage device 130 to execute a display method of an embodiment of the invention. Moreover, in the embodiment, the storage device 130 further includes a memory buffer used for recording images to be displayed.

The image capturing device 140 is, for example, a camera, which is configured with a Charge Coupled Device (CCD), a Complementary Metal-Oxide Semiconductor (CMOS)

device or other types of photosensing elements, and is adapted to sense an intensity of light entering the lens, so as to capture an image signal to generate and output an image. In the embodiment, the image capturing device 140 is disposed corresponding to a position of the display 110, and is configured to obtain an image of a field of view range in which a user watches the display 110.

In the embodiment, the ALS 150 is configured to obtain an ambient light intensity of the near-eye display system 100 (for example, the AR glasses) in a current usage environment.

The motion sensing device 160, for example, includes an Inertial Measurement Unit (IMU) of a three-axis accelerometer and gyroscope or a similar sensor. In the embodiment, the motion sensing device 160 may sense an angular velocity and an acceleration of the near-eye display system 100 (for example, the AR glasses) in a three-dimensional space, so as to determine a posture of the near-eye display system 100. In other words, the motion sensing device 160 may be used for determining a change of a current field of view direction of the near-eye display system 100.

Figure 2:
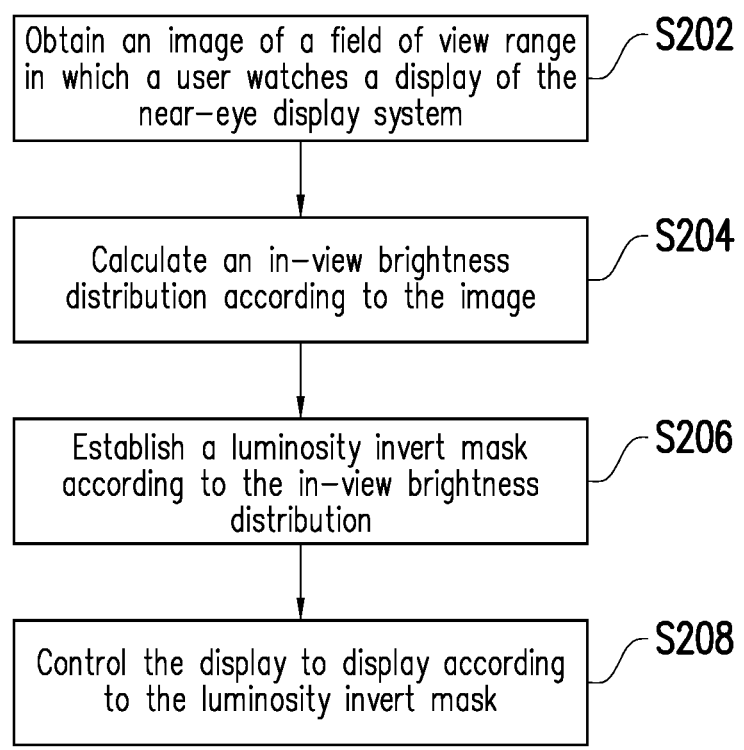
FIG. 2 is a flowchart illustrating a display method according to an embodiment of the invention.

FIG. 2 is a flowchart illustrating a display method according to an embodiment of the invention.

Referring to FIG. 1 and FIG. 2, the display method of the embodiment may be adapted to the near-eye display system 100 of FIG. 1, and detailed steps of the display method of the embodiment of the invention are described below with reference of various components in the near-eye display system 100.

First, the processor 120 obtains an image of a field of view range in which a user watches the display 110 of the near-eye display system 100 through the image capturing device 140 (step S202). Then, the processor 120 calculates an in-view brightness distribution according to the image (step S204). To be specific, the image of the field of view range in which the user watches the display 110 obtained by the processor 120 is, for example, a RGB format, and the processor 120, for example, converts the image into a YUV format. Since a Y value in the YUV format represents luminance, the Y values of all of pixels in the image may be for an in-view brightness distribution, which is described below with reference of an embodiment of FIG. 3.

FIG. 3 is a schematic diagram of an in-view brightness distribution according to an embodiment of the invention.

Referring to FIG. 3, the in-view brightness distribution DIST includes 16 pixels, where Y values of 7 pixels on the upper left are 255, Y values of 4 pixels on the lower right are 0, and Y values of the other pixels are 128. In the in-view brightness distribution DIST, the upper left corner has the highest brightness, and the brightness is gradually decreased towards the lower left corner.

Referring back to FIG. 2, after the in-view brightness distribution DIST is obtained, the processor 120 establishes a luminosity invert mask according to the in-view brightness distribution (step S206). In detail, the luminosity invert mask is a mask tool used for decreasing brightness, transmittance or transparency of a region with the higher brightness in subsequent steps. For example, the luminosity invert mask is, for example, a mask value distribution negatively related to the n-view brightness distribution DIST, where the mask value, for example, corresponds to brightness, transmittance or transparency, which is not limited by the invention. In other words, if a brightness value of a first pixel in the in-view brightness distribution DIST is greater than a brightness value of a second pixel, a mask value corresponding to the first pixel in the luminosity invert mask is not greater than a mask value corresponding to the second pixel.

In some embodiments, the processor 120, for example, calculates the mask value of each of the pixels in the luminosity invert mask according to a decreasing function, for example, $\alpha=f(Y)$, where f is the decreasing function, Y is a Y value of a pixel in the in-view brightness distribution, and a is the mask value of the pixel in the luminosity invert mask. Particularly, a form of the above decreasing function is not limited by the invention, which may be a linear function, a piecewise function, or other types of decreasing function.

Generally, a pupil size of the user directly relates to the current usage environment of the near-eye display system 100. Therefore, in some embodiments, the decreasing function used for establishing the luminosity invert mask may be related to the ambient light intensity of the near-eye display system 100 under the current environment. In detail, when the near-eye display system 100 is used under a state where the ambient light intensity is very low, a slightly higher brightness may make the user feel dazzling; and when the near-eye display system 100 is used under a state where the ambient light intensity is very high, only an extremely high brightness may make the user feel dazzling. Therefore, besides according to the in-view brightness distribution, the processor 120 establishes the luminosity invert mask further according to the current ambient light intensity information.

However, a resource of the ambient light intensity information is not limited by the invention. In some embodiments, the processor 120 may obtain the ambient light intensity information through the ALS 150. In some embodiments, the processor 120 may obtain the ambient light intensity information according to camera parameters such as an aperture value, an exposure value, a gain value, etc., of the image capturing device 140. In some embodiments, the processor 120 may also integrate sensing data of the ALS 150 and the camera parameters of the image capturing device 140 to calculate the ambient light intensity information.

In some embodiments, the processor 120 may, for example, set at least one brightness threshold to divide the brightness into a plurality of intervals, and set a mask value corresponding to each of the intervals. The processor 120 may establish the luminosity invert mask according to the above settings, which is described below with reference of FIG. 3 and FIG. 4.

FIG. 4 is a schematic diagram of the luminosity invert mask according to an embodiment of the invention.

Referring to FIG. 3 and FIG. 4, the processor 120, for example, sets two brightness thresholds to divide the Y values into a first interval (0-85), a second interval (86-170) and a third interval (171-255). The processor 120 may convert the pixel with the Y value of the first interval in the in-view brightness distribution DIST into the pixel with a mask value of 1 in the luminosity invert mask MK, and convert the pixel with the Y value of the second interval in the in-view brightness distribution DIST into the pixel with a mask value of 0.5 in the luminosity invert mask MK, and convert the pixel with the Y value of the third interval in the in-view brightness distribution DIST into the pixel with a mask value of 0 in the luminosity invert mask MK.

In some embodiments, according to different ambient light intensity information, the processor 120 may, for example, accordingly adjust the brightness thresholds to change a magnitude of each of the brightness intervals. For example, when the ambient light intensity is increased, the processor 120 may adjust the brightness thresholds to reduce a proportion of the third interval; and conversely when the ambient light intensity is decreased, the processor 120 may adjust the brightness thresholds to increase the proportion of the third interval. In other words, the brightness thresholds may be set according to the ambient light intensity information.

It should be noted that the invention does not limit a specific way for the processor 120 to establish the luminosity invert mask according to the in-view brightness distribution and the ambient light intensity information, and those with ordinary skills in the art may have an implement according to an actual requirement.

Referring back to FIG. 2, after the luminosity invert mask is established, the processor 120 controls the display 110 to display according to the luminosity invert mask (step S208). To be specific, after the luminosity invert mask is calculated, before the display 110 displays a next frame of the image to be displayed, the display 110 may first adjust the image to be displayed according to the luminosity invert mask, and then display the adjusted image to be displayed.

In some embodiments, the luminosity invert mask corresponds to transmittance or transparency, so that the processor 120 may adjust a transmittance or a transparency of the image to be displayed according to the luminosity invert mask, for example, to multiply the transparency of the image to be displayed by the luminosity invert mask, and then displays the adjusted image to be displayed.

In some embodiments, the luminosity invert mask corresponds to brightness, so that the processor 120 may adjust a brightness of the image to be displayed according to the luminosity invert mask, for example, to multiply the brightness of the image to be displayed by the luminosity invert mask, and then displays the adjusted image to be displayed. An embodiment of FIG. 5 is provided below for further description.

Figure 5:
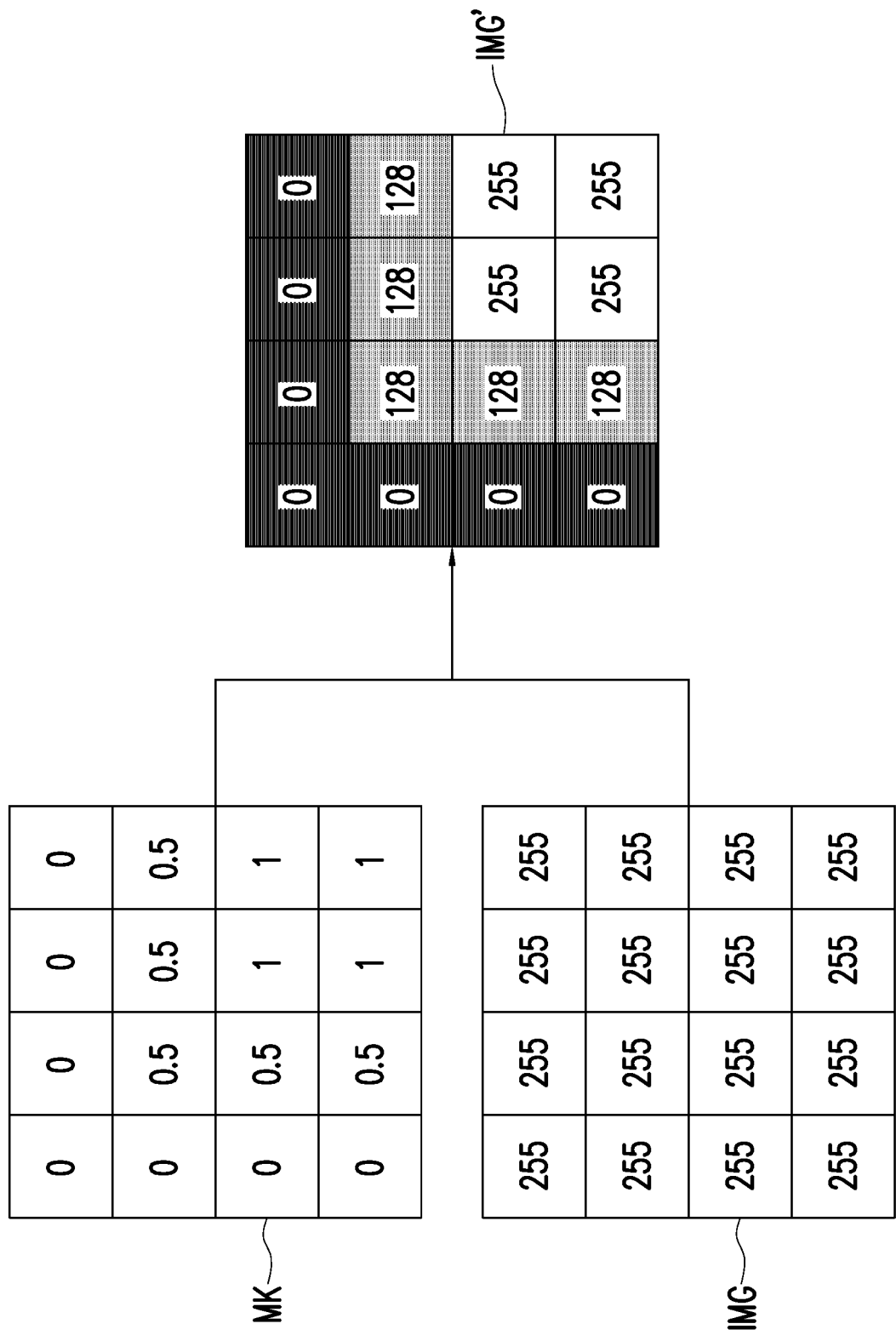
FIG. 5 is a schematic diagram of adjusting an image to be displayed according to an embodiment of the invention.

FIG. 5 is a schematic diagram of adjusting the image to be displayed according to an embodiment of the invention.

Referring to FIG. 4 and FIG. 5, the processor 120, for example, obtains the image to be displayed from a FrameBuffer, and in the embodiment, the image to be displayed is, for example, a full-white image of the RGB format. Before the display 110 displays the image to be displayed, the processor 120 first converts the image to be displayed of the RGB format into an image to be displayed IMG of the YUV format. As shown in FIG. 5, the Y value of each pixel in the image to be displayed IMG of the YUV format is 255. In the embodiment, the processor 120 may multiply the Y values of the image to be displayed IMG by the luminosity invert mask MK to obtain the adjusted image to be displayed IMG'. As shown in FIG. 5, in the adjusted image to be displayed IMG', an upper left region of the image corresponding to the mask value of 0 also has the brightness value of 0, a lower right region of the image corresponding to the mask value of 1 has the brightness value maintained to 255. Therefore, the luminosity invert mask MK may decrease the brightness of the upper left part of the image to be displayed IMG in the FrameBuffer. Finally, the processor 120 may again convert the image to be displayed IMG' with decreased brightness from the YUV format to the RGB format for displaying in the display 110.

In some embodiments, after the luminosity invert mask is calculated, the processor 120 further adjusts the luminosity invert mask according to information of the motion sensing device 160.

Figure 6:
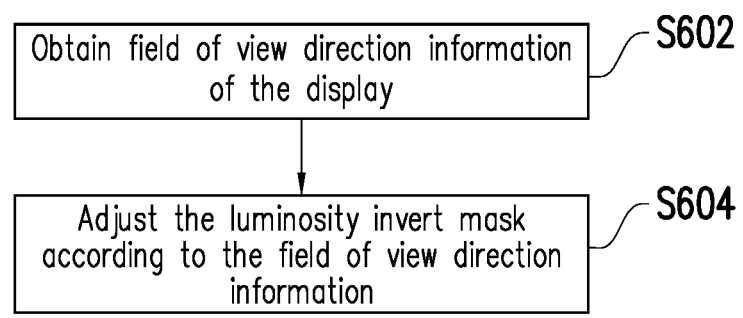
FIG. 6 is a flowchart illustrating a method adjusting the luminosity invert mask according to an embodiment of the invention.

FIG. 6 is a flowchart illustrating a method adjusting the luminosity invert mask according to an embodiment of the invention.

Referring to FIG. 6, the processor 120 obtains field of view direction information of the display 110 through the motion sensing device 160 (step S602). To be specific, according to the information of the motion sensing device 160, the processor 120 may calculate a head swing motion of the user, so as to learn how the field of view direction of the display 110 changes. For example, when the processor 120 calculates that the user's head swings down, it is learned that the field of view direction of the display 110 also changes downward.

Thereafter, the processor 120 adjusts the luminosity invert mask according to the field of view direction information (step S604). To be specific, the processor 120 may correspondingly shift a pixel position of each mask value in the luminosity invert mask according to the change of the field of view direction of the display 110. For example, when the field of view direction of the display 110 is changed downward, the processor 120 shifts the pixel position of each mask value in the luminosity invert mask upward.

Figure 7:
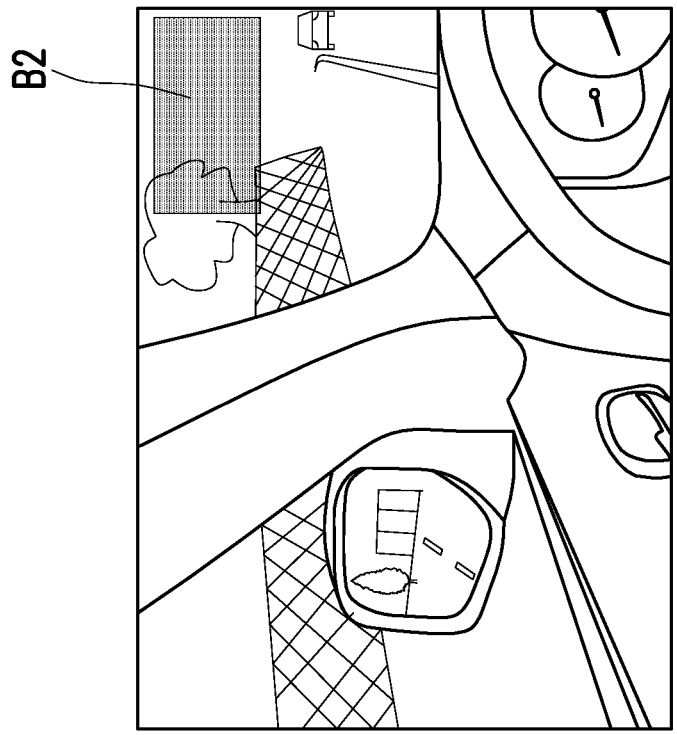
FIG. 7 is a schematic diagram of adjusting the luminosity invert mask according to an embodiment of the invention.
Figure 7:
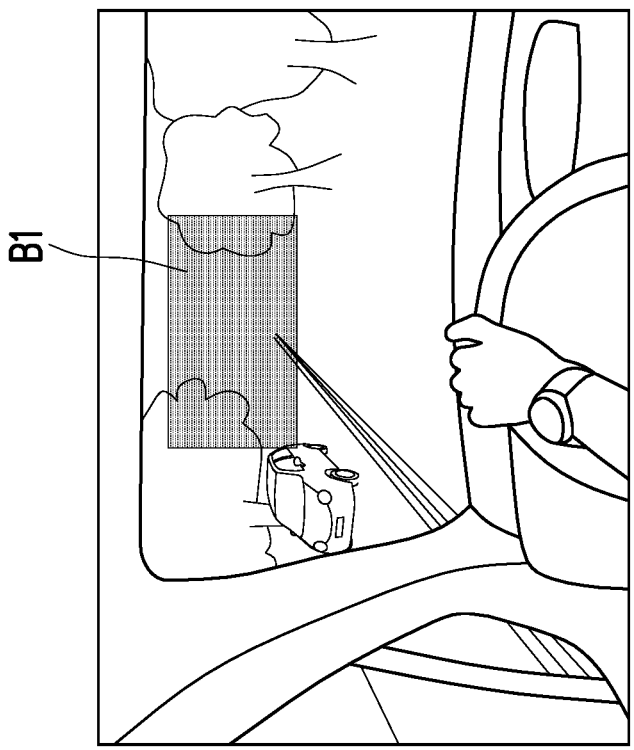

FIG. 7 is a schematic diagram of adjusting the luminosity invert mask according to an embodiment of the invention.

Referring to FIG. 7, it is assumed that when the user drives a vehicle, the display 110 has a first field of view range RG1 in a first field of view direction. Since the external light corresponding to a region B1 of the first field of view range RG1 is too strong, the luminosity invert mask decreases the image brightness corresponding to the region B1 of the first field of view range RG1. In this case, when the user turns his head to the lower left to view a rearview mirror, the display 110 is changed to a second field of view direction, and has a second field of view range RG2 in the second field of view direction. The processor 120 may calculate that the field of view direction of the display 110 is moved towards the lower left according to the information of the motion sensing device 160, so that the processor 120 may correspondingly shift the pixel position of each mask value in the luminosity invert mask towards the upper right, such that the luminosity invert mask decreases the image brightness corresponding to a region B2 of the second field of view range RG2.

In some embodiments, a frequency (for example, a first frequency) that the processor 120 calculates the luminosity invert mask according to the image captured by the image capturing device 140 is smaller than a frequency (for example, a second frequency greater than the first frequency) that the processor 120 adjusts the luminosity invert mask according to the information of the motion sensing device 160. Since a calculation burden of calculating the luminosity invert mask according to the image is higher than a calculation burden of directly adjusting the luminosity invert mask according to the information of the motion sensing device 160, to decrease the frequency of calculating the luminosity invert mask according to the image avails improving a battery life of the near-eye display system 100.

In summary, according to the near-eye display system and the display method thereof provided by the embodiments of the invention, the image capturing device is adopted to obtain the image of the field of view range in which the user watches the display of the near-eye display system. The processor may calculate the in-view brightness distribution according to the image. Then, the processor adjusts the brightness, transmittance or transparency of the image to be displayed according to the in-view brightness distribution. In this way, while the user may clearly view the AR image, interference of the external strong light is avoided. Moreover, according to the embodiment of the invention, after the luminosity invert mask is calculated, the luminosity invert mask may be adjusted according to the information of the motion detecting device. In this way, the calculation burden of the near-eye display system is reduced and the battery life is prolonged.

It will be apparent to those skilled in the art that various modifications and variations can be made to the disclosed embodiments without departing from the scope or spirit of the invention. In view of the foregoing, it is intended that the invention covers modifications and variations provided they fall within the scope of the following claims and their equivalents.

What is claimed is:

1. A near-eye display system, comprising:
    a display;
    an image capturing device, configured to obtain an image of a field of view range in which a user watches the display;
    a storage device, configured to record programs or commands; and
    a processor, coupled to the display, the image capturing device and the storage device, and loading and executing the programs or commands recorded in the storage device to:
        calculate an in-view brightness distribution according to the image;
        establish a luminosity invert mask according to the in-view brightness distribution, wherein the luminosity invert mask is a mask value distribution corresponding to brightness, transmittance or transparency;
        adjust a brightness, a transmittance or a transparency of an image to be displayed according to the mask value distribution; and
        control the display to display the adjusted image to be displayed.

2. The near-eye display system as claimed in claim 1, wherein the luminosity invert mask is negatively related to the in-view brightness distribution.

3. The near-eye display system as claimed in claim 2, wherein the storage device is configured to record the image to be displayed, and the processor controls the display to display according to the luminosity invert mask, wherein when pixels the image to be displayed are respectively adjusted according to a plurality of mask values in the mask value distribution, the display displays the adjusted image to be displayed.

4. The near-eye display system as claimed in claim 1, further comprising:
    an ambient light sensor, coupled to the processor, and configured to obtain an ambient light intensity information, wherein the processor establishes the luminosity invert mask according to the in-view brightness distribution and the ambient light intensity information.

5. The near-eye display system as claimed in claim 4, wherein the processor sets a brightness threshold according to the ambient light intensity information, and establishes the luminosity invert mask according to the in-view brightness distribution and the brightness threshold.

6. The near-eye display system as claimed in claim 1, further comprising:
    a motion sensing device, coupled to the processor, and configured to obtain a field of view direction information of the display, wherein the processor further adjusts the luminosity invert mask according to the field of view direction information.

7. The near-eye display system as claimed in claim 6, wherein the processor calculates the in-view brightness distribution according to the image and establishes the luminosity invert mask according to the in-view brightness distribution in a first frequency, and adjusts the luminosity invert mask according to the field of view direction information in a second frequency, wherein the first frequency is smaller than the second frequency.

8. A display method, adapted to a near-eye display system, the display method comprising:
    obtaining an image of a field of view range in which a user watches a display of the near-eye display system;
    calculating an in-view brightness distribution according to the image;
    establishing a luminosity invert mask according to the in-view brightness distribution, wherein the luminosity invert mask is a mask value distribution corresponding to brightness, transmittance or transparency;
    adjusting a brightness, a transmittance or a transparency of an image to be displayed according to the mask value distribution; and
    controlling the display to display the adjusted image to be displayed.

9. The display method as claimed in claim 8, wherein the luminosity invert mask is negatively related to the in-view brightness distribution.

10. The display method as claimed in claim 9, wherein the step of controlling the display the adjusted image to be displayed comprises:
    when pixels in the image to be displayed are respectively adjusted according to a plurality of mask values in the mask value distribution, displaying the adjusted image to be displayed by the display.

11. The display method as claimed in claim 8, wherein the step of establishing a luminosity invert mask according to the in-view brightness distribution comprises:
    obtaining an ambient light intensity information; and
    establishing the luminosity invert mask according to the in-view brightness distribution and the ambient light intensity information.

12. The display method as claimed in claim 11, wherein the step of establishing the luminosity invert mask according to the in-view brightness distribution and the ambient light intensity information comprises:
    setting a brightness threshold according to the ambient light intensity information; and
    establishing the luminosity invert mask according to the in-view brightness distribution and the brightness threshold.

13. The display method as claimed in claim 8, further comprising:
    obtaining a field of view direction information of the display; and
    adjusting the luminosity invert mask according to the field of view direction information.

14. The display method as claimed in claim 13, wherein calculating the in-view brightness distribution according to the image and establishing the luminosity invert mask according to the in-view brightness distribution are performed by a processor of the near-eye display system in a first frequency, and adjusting the luminosity invert mask according to the field of view direction information is performed by the processor in a second frequency, wherein the first frequency is smaller than the second frequency.

* * * * *